(12) United States Patent
Sasturkar et al.

(10) Patent No.: US 10,693,750 B2
(45) Date of Patent: *Jun. 23, 2020

(54) HIERARCHICAL SERVICE ORIENTED APPLICATION TOPOLOGY GENERATION FOR A NETWORK

(71) Applicant: Lightbend, Inc., San Francisco, CA (US)

(72) Inventors: Amit Sasturkar, San Jose, CA (US); Vishal Surana, Sunnyvale, CA (US); Omer Emre Velipasaoglu, San Francisco, CA (US); Abhinav A. Vora, San Francisco, CA (US); Aiyesha Lowe Ma, Sunnyvale, CA (US)

(73) Assignee: Lightbend, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/261,134

(22) Filed: Jan. 29, 2019

(65) Prior Publication Data
US 2019/0158369 A1 May 23, 2019

Related U.S. Application Data

(63) Continuation of application No. 15/919,064, filed on Mar. 12, 2018, now Pat. No. 10,200,260, which is a
(Continued)

(51) Int. Cl.
*G06F 15/173* (2006.01)
*H04L 12/26* (2006.01)
(Continued)

(52) U.S. Cl.
CPC .......... *H04L 43/045* (2013.01); *H04L 29/06* (2013.01); *H04L 29/08072* (2013.01);
(Continued)

(58) Field of Classification Search
CPC .. H04L 29/08072; H04L 29/06; H04L 43/062
(Continued)

(56) References Cited

U.S. PATENT DOCUMENTS 6,182,136 B1   1/2001   Ramanathan et al.
6,286,047 B1   9/2001   Ramanathan et al.
(Continued)

OTHER PUBLICATIONS

U.S. Appl. No. 14/878,910—Office Action dated Jul. 3, 2017, 9 pages.
(Continued)

*Primary Examiner* — Khanh Q Dinh
(74) *Attorney, Agent, or Firm* — Haynes Beffel & Wolfeld LLP; Paul A. Durdik

(57) ABSTRACT

The technology disclosed relates to understanding traffic patterns in a network with a multitude of processes running on numerous hosts. In particular, it relates to using at least one of rule based classifiers and machine learning based classifiers for clustering processes running on numerous hosts into local services and clustering the local services running on multiple hosts into service clusters, using the service clusters to aggregate communications among the processes running on the hosts and generating a graphic of communication patterns among the service clusters with available drill-down into details of communication links. It also relates to using predetermined command parameters to create service rules and machine learning based classifiers that identify host-specific services. In one implementation, user feedback is used to create new service rules or classifiers and/or modify existing service rules or classifiers so as to improve accuracy of the identification of the host-specific services.

20 Claims, 9 Drawing Sheets

Understanding Traffic Patterns In A Network

Related U.S. Application Data continuation of application No. 14/878,910, filed on Oct. 8, 2015, now Pat. No. 9,917,751.

(60) Provisional application No. 62/169,489, filed on Jun. 1, 2015.

(51) Int. Cl.
*H04L 29/06* (2006.01)
*H04L 29/08* (2006.01)
*H04W 12/08* (2009.01)

(52) U.S. Cl.
CPC .......... *H04L 43/062* (2013.01); *H04L 69/329* (2013.01); *H04W 12/08* (2013.01)

(58) Field of Classification Search
USPC ................ 709/203, 220, 224, 226, 228, 232
See application file for complete search history.

(56) References Cited

U.S. PATENT DOCUMENTS

| | | | |
|---|---|---|---|
| 6,336,138 B1 | 1/2002 | Caswell et al. | |
| 6,834,303 B1 | 12/2004 | Garg et al. | |
| 7,240,325 B2 | 7/2007 | Keller | |
| 7,536,405 B2 | 5/2009 | Tschiegg et al. | |
| 7,675,857 B1 | 3/2010 | Chesson | |
| 8,028,337 B1 | 9/2011 | Xu et al. | |
| 8,775,478 B2 | 7/2014 | Kaufman et al. | |
| 8,856,936 B2 | 10/2014 | Datta Ray et al. | |
| 9,197,599 B1 * | 11/2015 | Barry | G06F 11/0709 |
| 9,203,856 B2 | 12/2015 | Boggs et al. | |
| 9,239,800 B2 | 1/2016 | Luna et al. | |
| 9,565,207 B1 | 2/2017 | Marr et al. | |
| 9,641,545 B2 | 5/2017 | Boggs et al. | |
| 9,720,883 B2 | 8/2017 | Kan et al. | |
| 9,781,012 B2 | 10/2017 | Brandwine et al. | |
| 9,886,288 B2 | 2/2018 | Baird et al. | |
| 9,917,751 B2 | 3/2018 | Sasturkar et al. | |
| 9,917,757 B2 * | 3/2018 | Farrow | H04L 43/087 |
| 9,917,860 B2 | 3/2018 | Senanayake et al. | |
| 10,129,117 B2 * | 11/2018 | Gupta | G06F 16/288 |
| 10,177,998 B2 * | 1/2019 | Parandehgheibi | G06F 16/2322 |
| 10,230,597 B2 * | 3/2019 | Parandehgheibi | G06F 3/04847 |
| 10,305,757 B2 * | 5/2019 | Yadav | G06F 16/174 |
| 10,326,672 B2 * | 6/2019 | Scheib | H04L 43/0882 |
| 10,439,904 B2 * | 10/2019 | Deen | G06F 16/2365 |
| 10,516,585 B2 * | 12/2019 | Parandehgheibi | G06F 9/45558 |
| 2011/0191303 A1 | 8/2011 | Kaufman et al. | |
| 2014/0020066 A1 | 1/2014 | Vashist et al. | |
| 2014/0250221 A1 | 9/2014 | Boggs et al. | |
| 2016/0055129 A1 | 2/2016 | Kan et al. | |
| 2016/0212171 A1 | 7/2016 | Senanayake et al. | |
| 2016/0359872 A1 * | 12/2016 | Yadav | H04L 43/04 |
| 2018/0205620 A1 * | 7/2018 | Sasturkar | H04L 43/045 |

OTHER PUBLICATIONS

U.S. Appl. No. 14/878,910—Response to Office Action dated Jul. 3, 2017 filed on Aug. 22, 2017, 8 pages.

U.S. Appl. No. 14/878,910—Notice of Allowance dated Nov. 1, 2017, 12 pages.

U.S. Appl. No. 15/919,064—Notice of Allowance dated Oct. 2, 201, 18 pages.

* cited by examiner

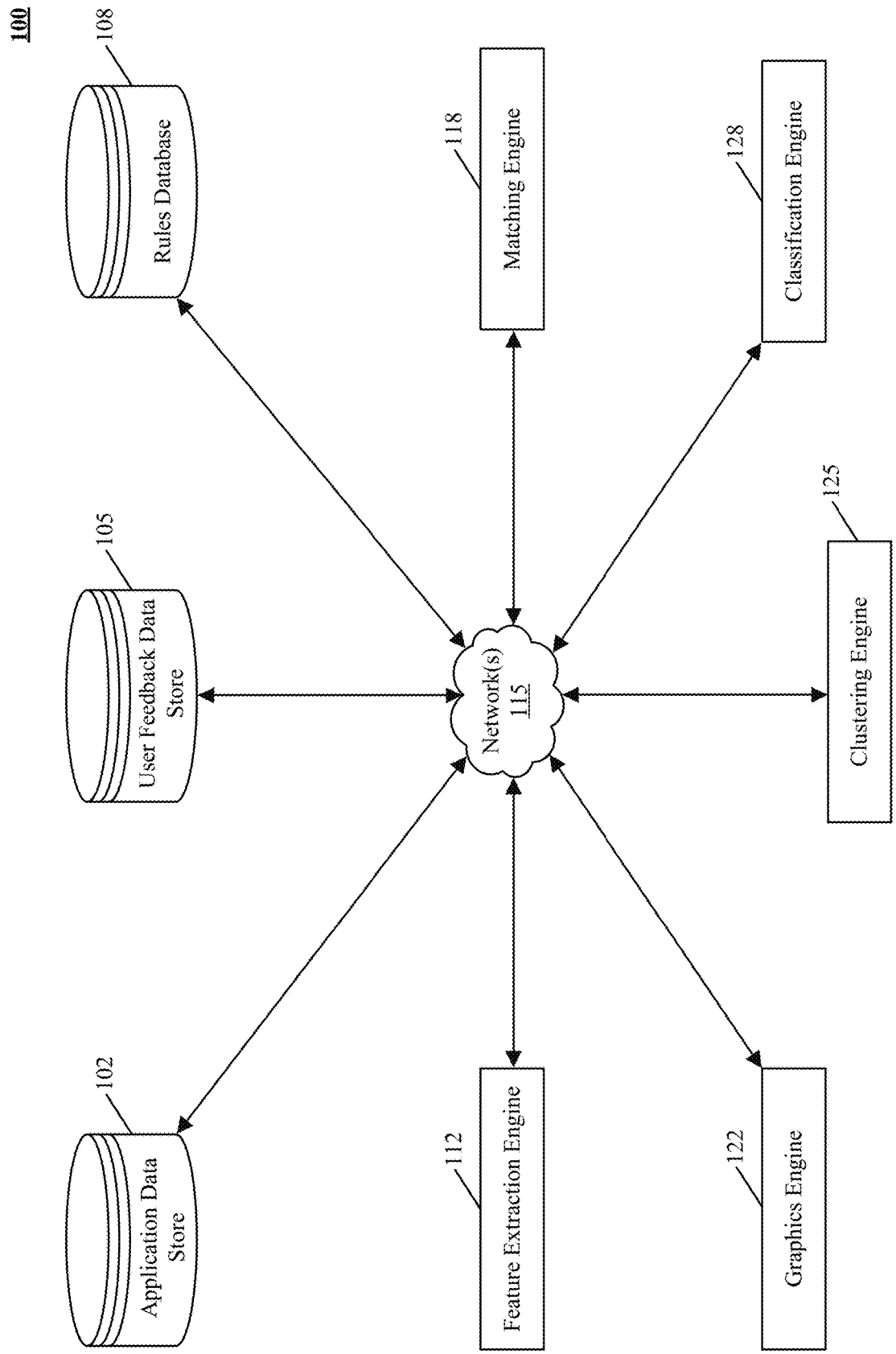
FIG. 1 – Service Oriented Application Topology Generation

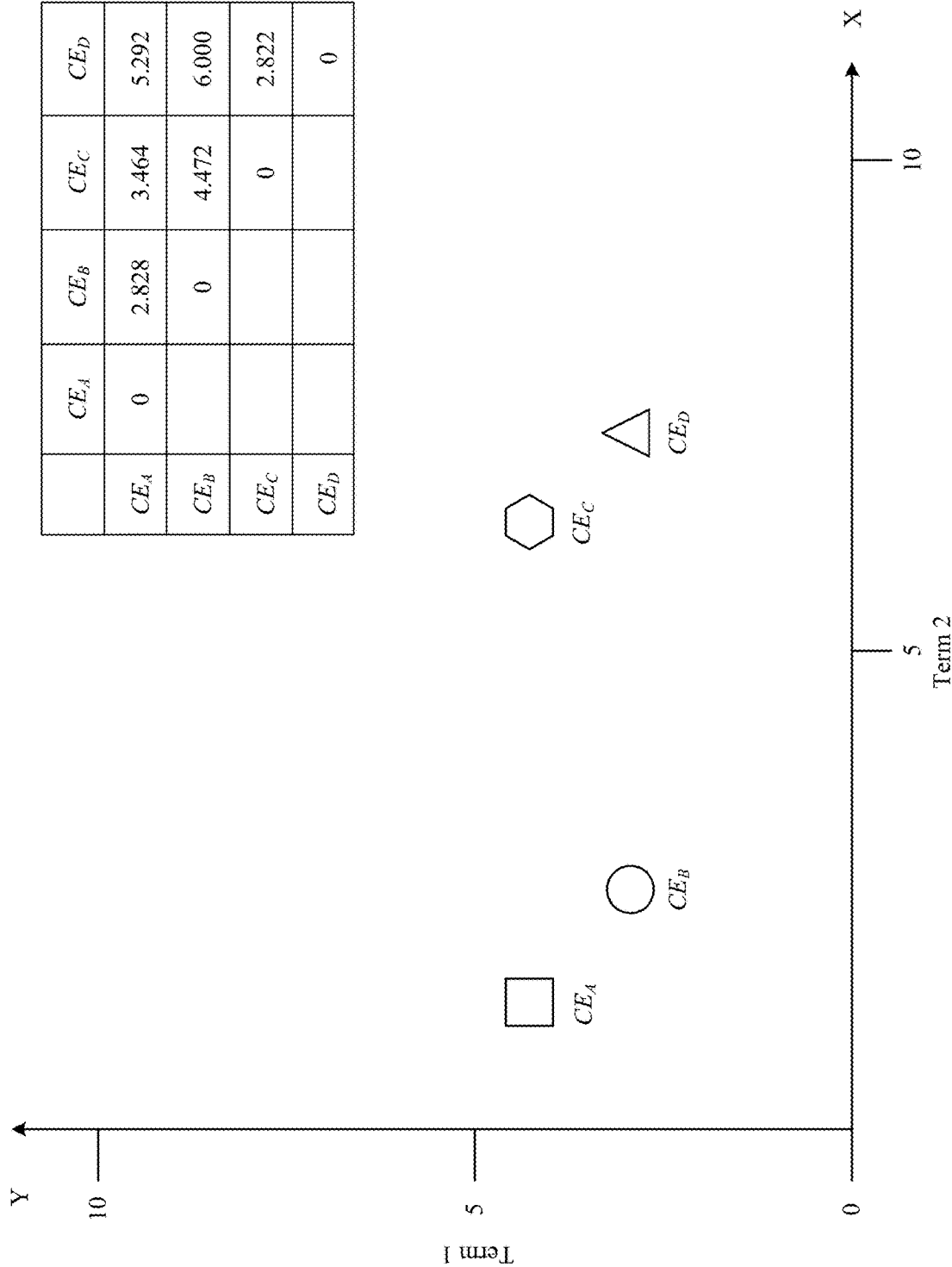
FIG. 2 – Process Similarity Determination

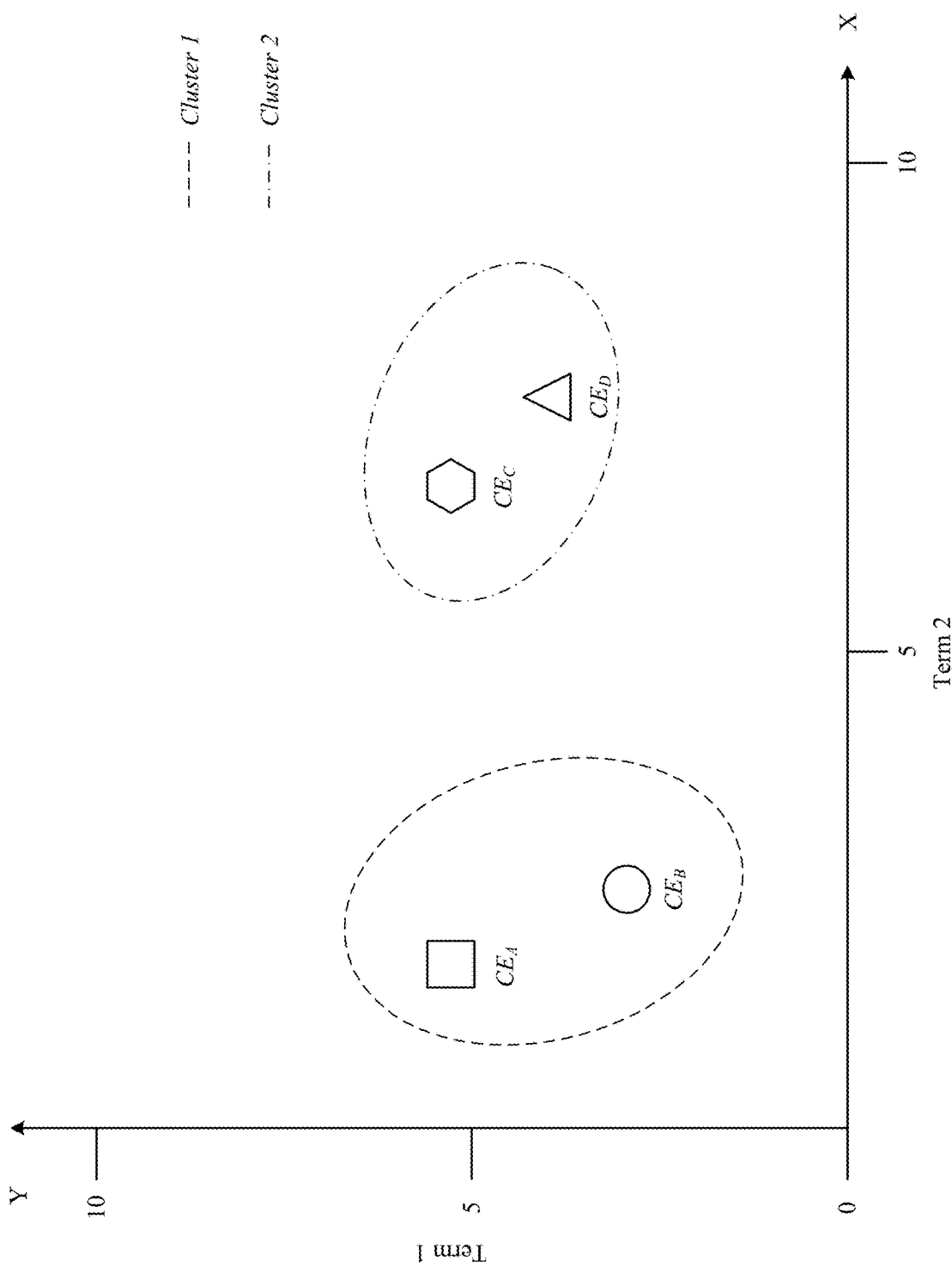
FIG. 3 – Process And Host Clustering

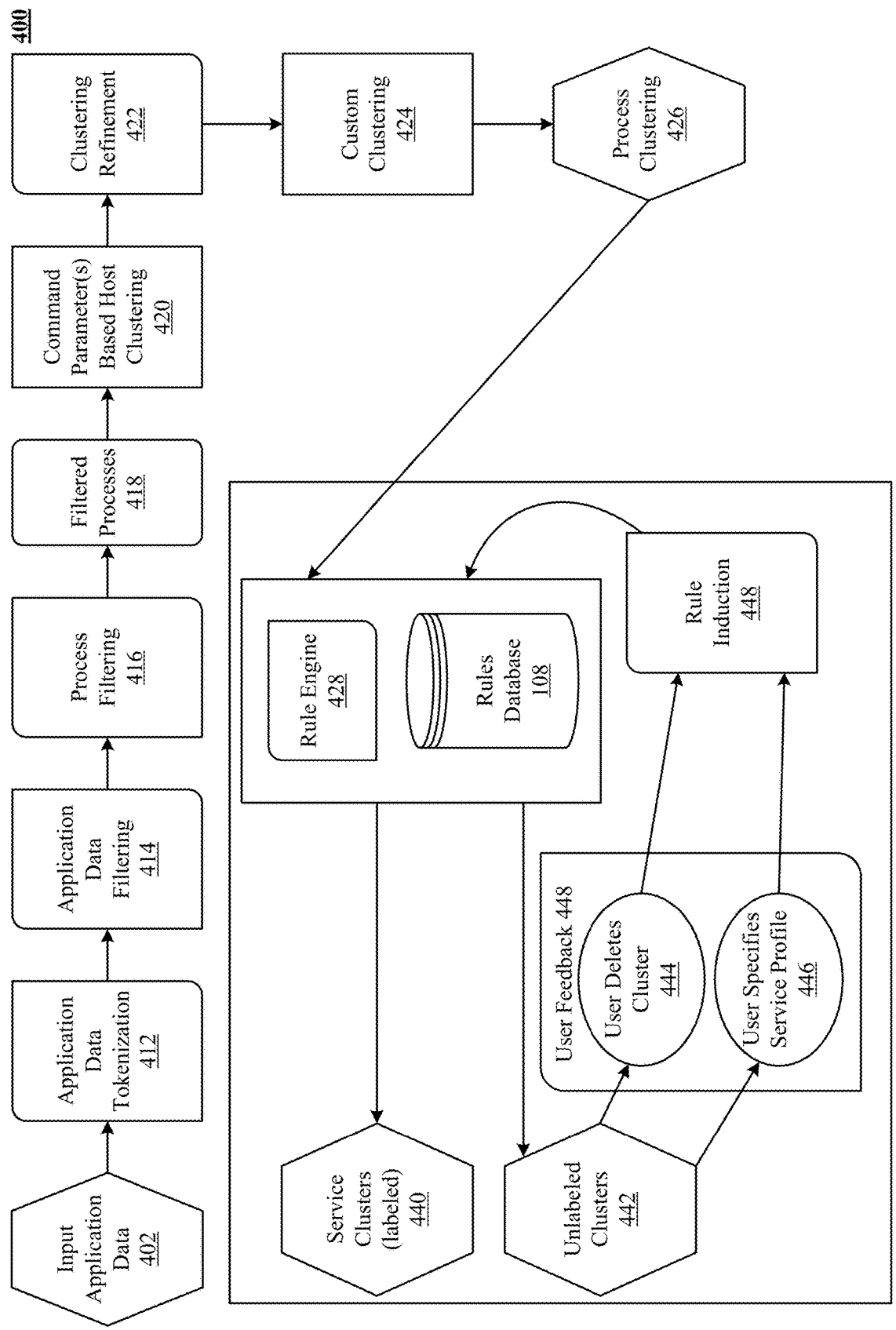
FIG. 4 – Service Profile Classification Workflow

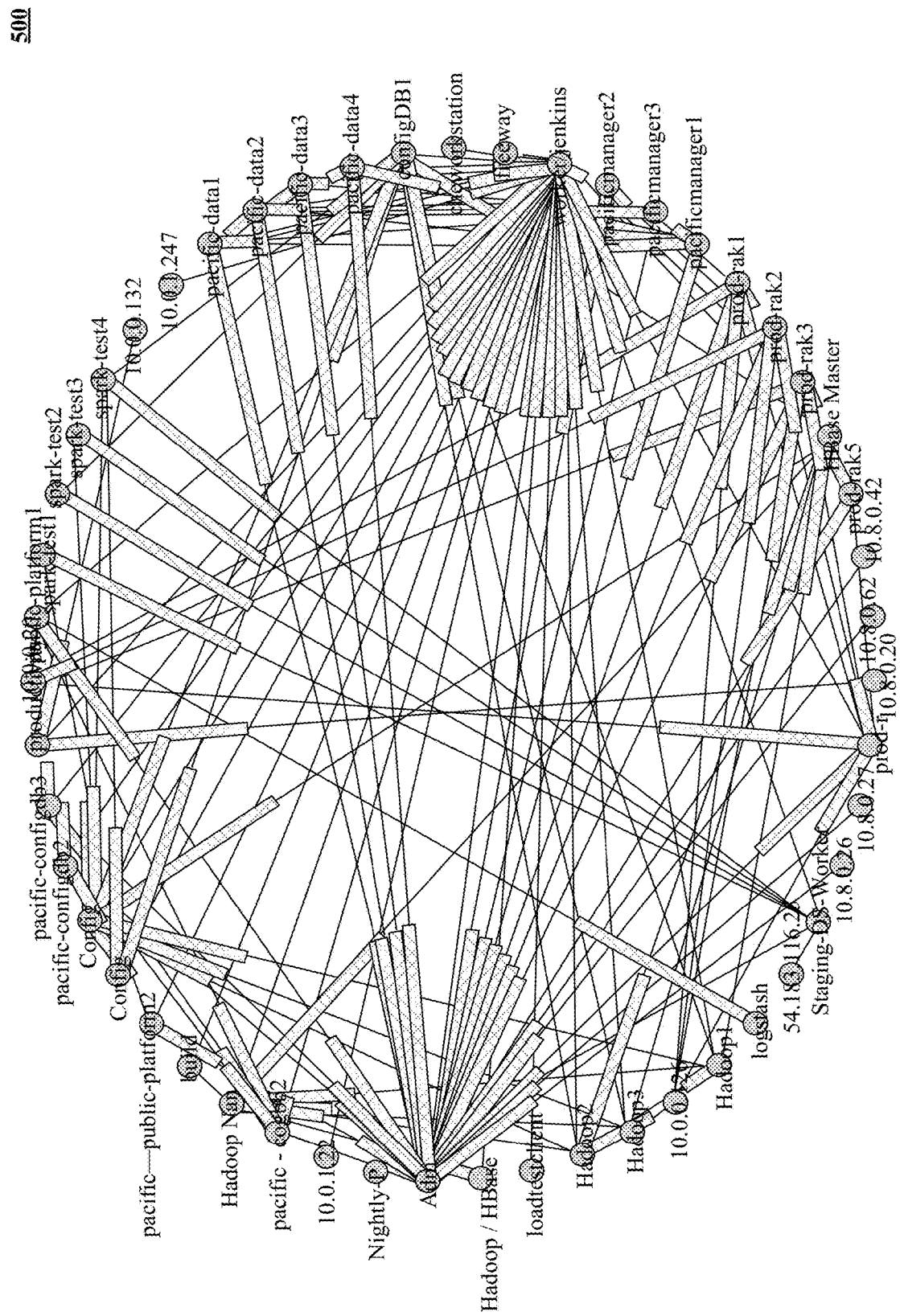
FIG. 5 – Host Oriented Communication Patterns Graphic

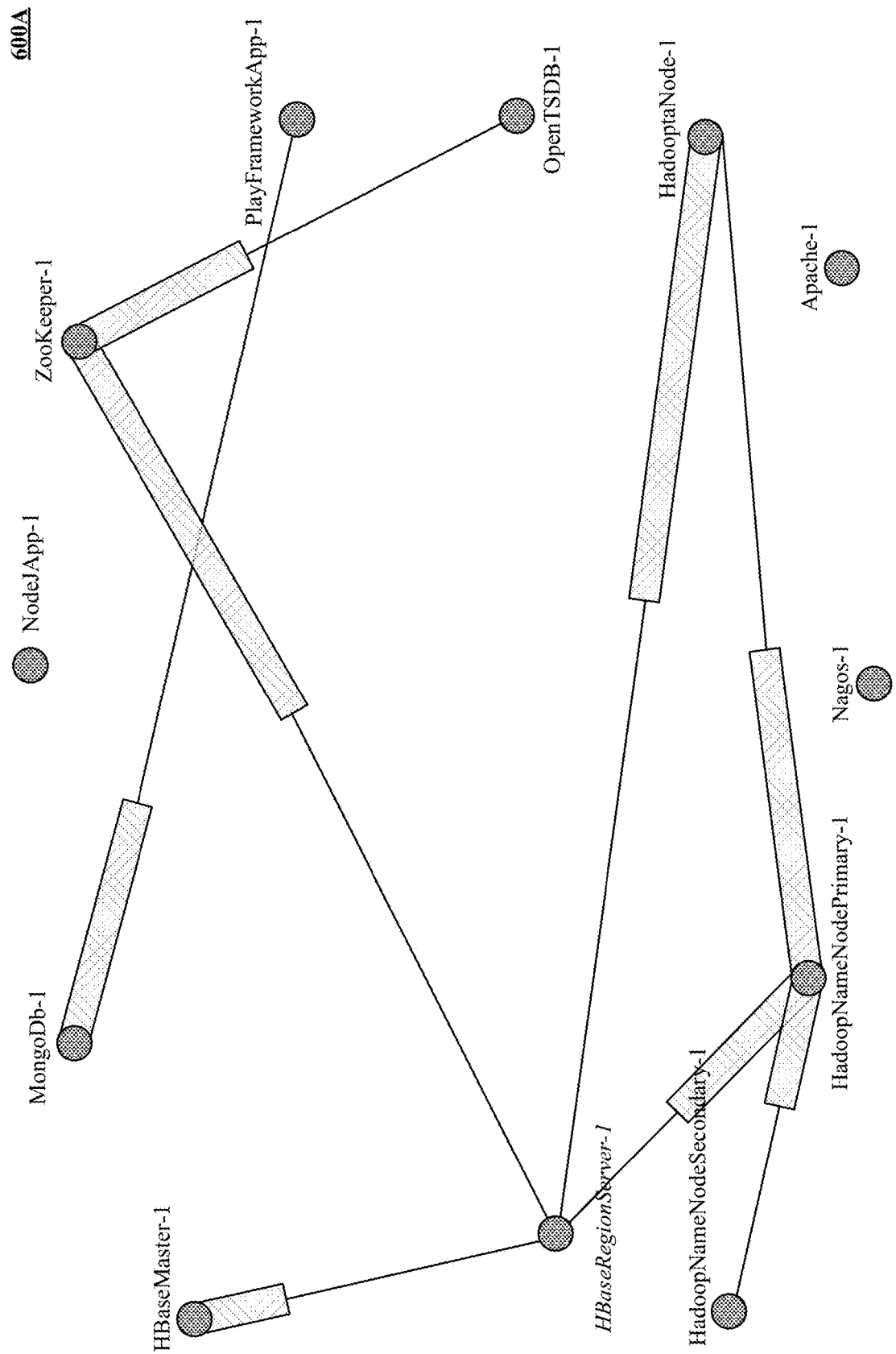
FIG. 6A – Service Oriented Communication Patterns Graphic

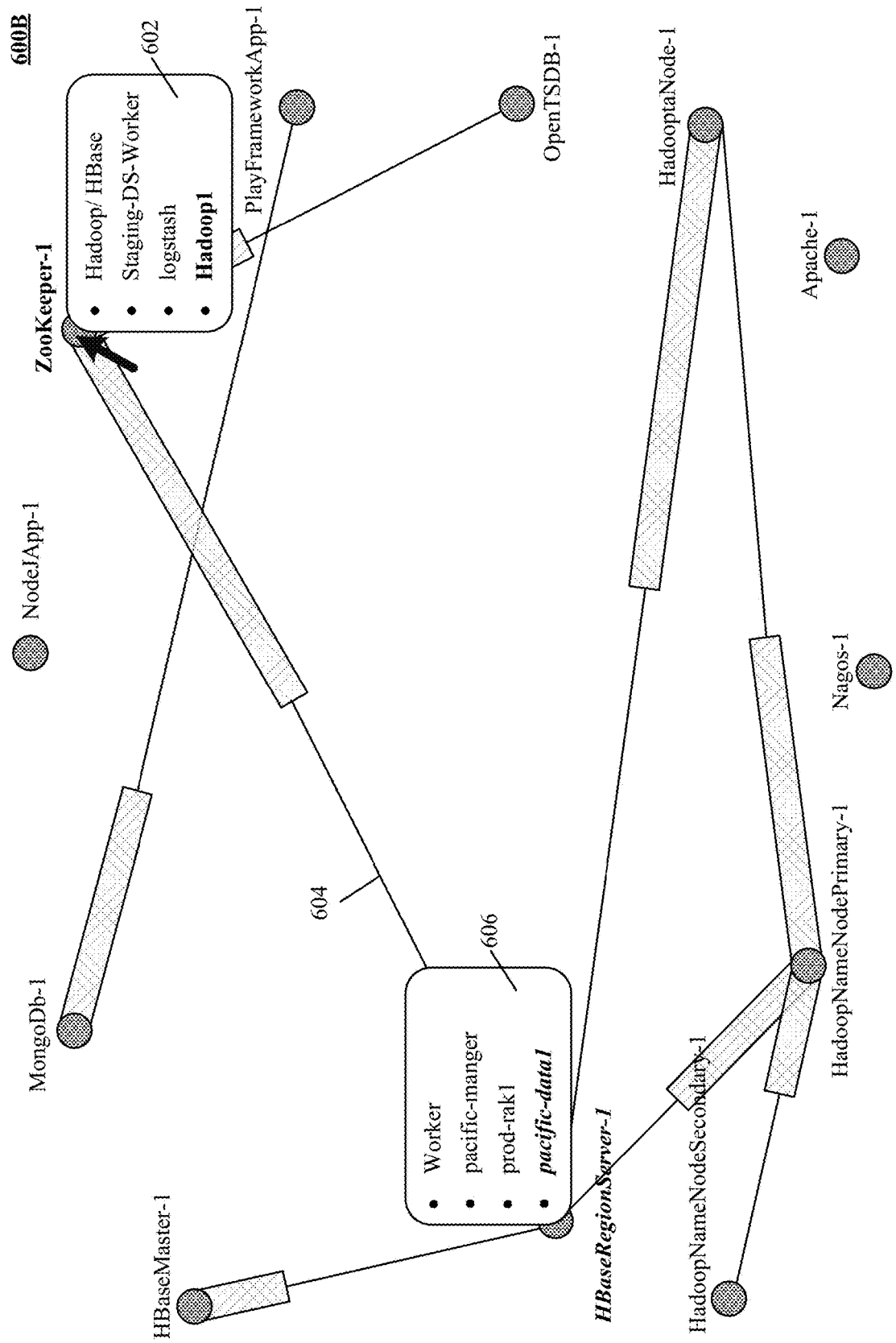
FIG. 6B – Service Oriented Communication Patterns Graphic

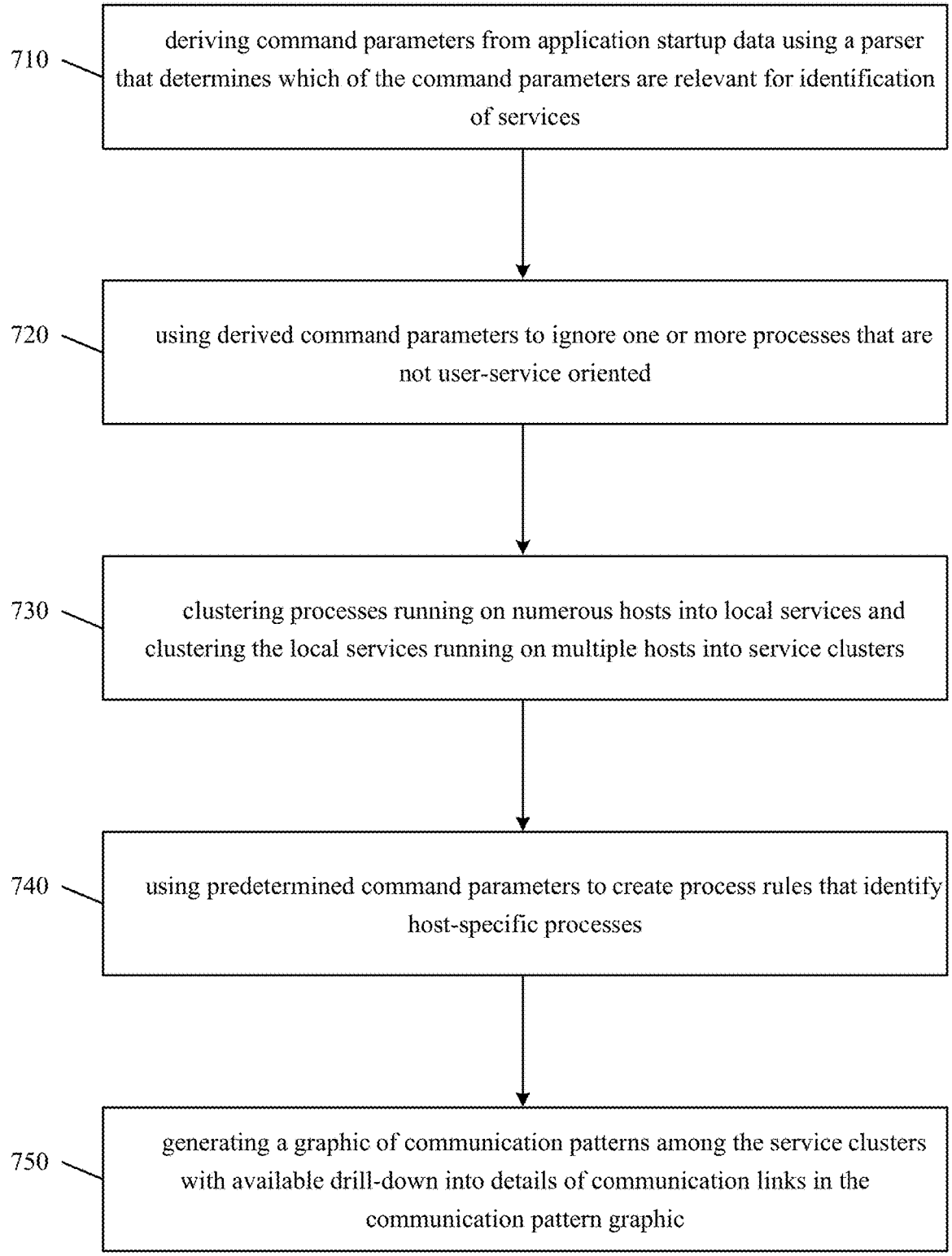
FIG. 7 – Understanding Traffic Patterns In A Network

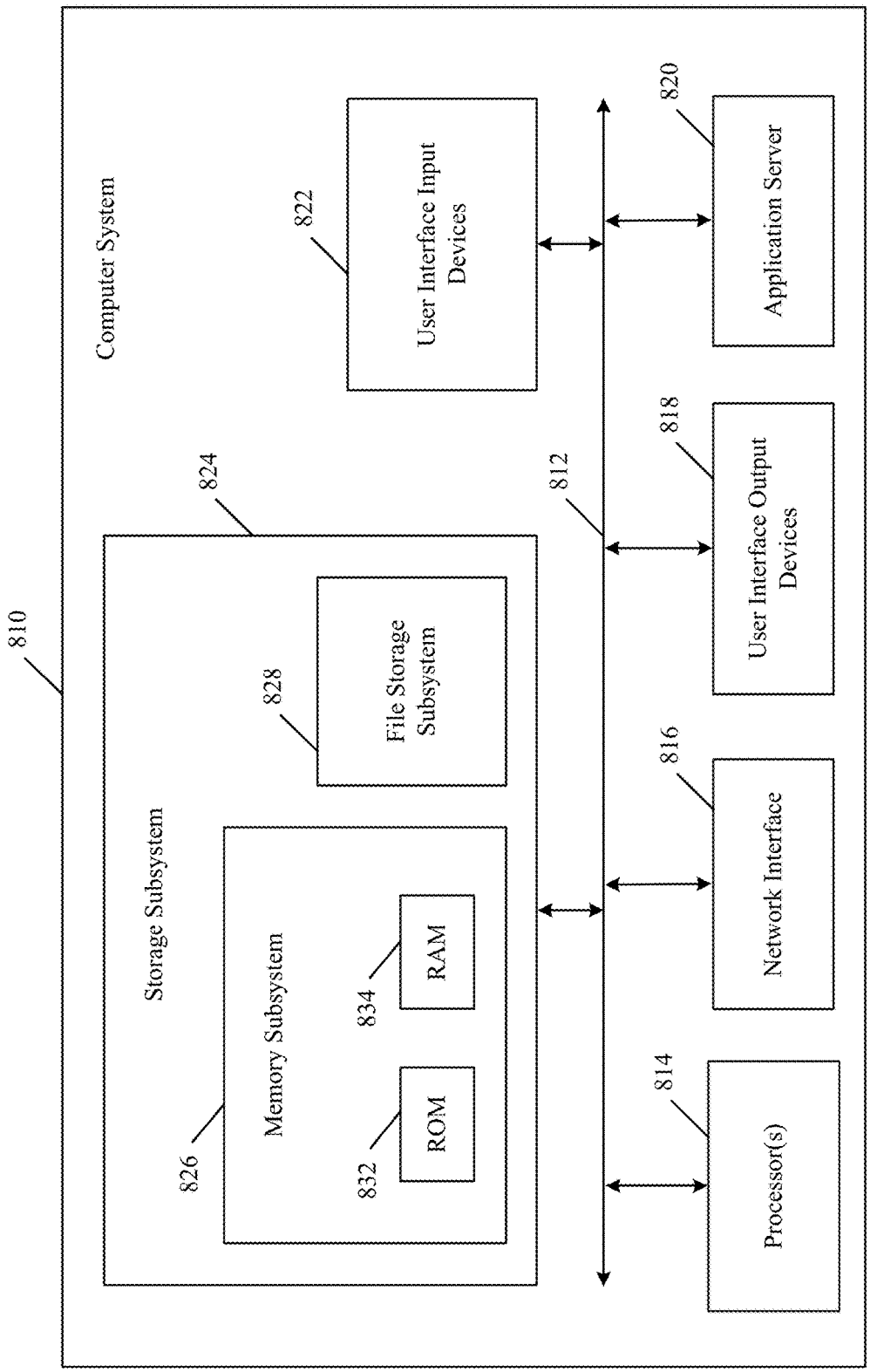
FIG. 8 – Computer System

HIERARCHICAL SERVICE ORIENTED APPLICATION TOPOLOGY GENERATION FOR A NETWORK

RELATED APPLICATION

This application is a continuation of U.S. application Ser. No. 15/919,064, entitled "HIERARCHICAL SERVICE ORIENTED APPLICATION TOPOLOGY GENERATION FOR A NETWORK", filed on Mar. 12, 2018, which is a continuation of U.S. application Ser. No. 14/878,910, entitled "HIERARCHICAL SERVICE ORIENTED APPLICATION TOPOLOGY GENERATION FOR A NETWORK", filed Oct. 8, 2015, which claims the benefit of U.S. Provisional Application No. 62/169,489, entitled "HIERARCHICAL SERVICE ORIENTED APPLICATION TOPOLOGY GENERATION FOR A NETWORK", filed Jun. 1, 2015. The provisional and non-provisional applications are hereby incorporated by reference for all purposes.

INCORPORATIONS

Materials incorporated by reference in this filing include the following:

"ORGANIZING NETWORK PERFORMANCE METRICS INTO HISTORICAL ANOMALY DEPENDENCY DATA," US Non. Prov. application Ser. No. 14/276,826, filed May 13, 2014; and "ORGANIZING NETWORK PERFORMANCE METRICS INTO HISTORICAL ANOMALY DEPENDENCY DATA," U.S. Non. Prov. application Ser. No. 14/276,846, filed May 13, 2014.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The advent of cloud computing and on-line services has led to exponential growth in size and complexity of data centers. This has created unprecedented challenges for system management and monitoring. Given the scale and scope of such large data centers, network operators and monitoring tools are overwhelmed with monitoring and analytics metrics across several thousand network layers and network elements. Currently, network operators and monitoring tools conduct much of the forensic examination based on communications between numerous hosts of a network. Such a host-based network analysis creates a cloud picture of the network health with numerous noise channels that can be obviated.

It is therefore necessary to provide methods and systems that enhance the transparency and feasibility of the network monitoring and analytics metrics by adapting a service-centric model of network analysis. An opportunity arises to increase operator-friendliness in network monitoring environments. Improved user experience and engagement and higher customer satisfaction and retention may result.

SUMMARY

The technology disclosed relates to understanding traffic patterns in a network with a multitude of processes running on numerous hosts. In particular, it relates to clustering processes running on numerous hosts into local services and clustering the local services running on multiple hosts into service clusters, using the service clusters to aggregate communications among the processes running on the hosts and generating a graphic of communication patterns among the service clusters with available drill-down into details of communication links in the communication pattern graphic. It also relates to using predetermined command parameters to create process rules that identify host-specific processes. In one implementation, user feedback is used to create new process rules and/or modify existing process rules so as to improve accuracy of the identification of the host-specific processes.

Other aspects and advantages of the present invention can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1 shows an example environment of generating a hierarchical service oriented application topology for a network.

FIG. 2 shows one implementation of identifying hosts of a network with common functionality.

FIG. 3 shows one implementation of classification of hosts with common functionality into service profiles.

FIG. 4 illustrates a workflow of generating hierarchical service oriented application topology for a network.

FIG. 5 depicts one implementation of a communication patterns graphic that graphically represents a host oriented network topology.

FIGS. 6A and 6B illustrate implementations of communication patterns graphics that graphically represent a service oriented application topology.

FIG. 7 is a flowchart showing a method of understanding traffic patterns in a network with a multitude of processes running on numerous hosts.

FIG. 8 is a block diagram of an example computer system for understanding traffic patterns in a network with a multitude of processes running on numerous hosts.

DESCRIPTION

Introduction

Implementations of the technology disclosed can include one or more of the following features and/or features described in connection with additional implementations disclosed. In the interest of conciseness, the combinations of features disclosed in this application are not individually enumerated and are not repeated with each base set of features. The reader will understand how features identified can readily be combined with sets of base features identified as implementations such as service oriented application topology generation environment, vector space model representation, process similarity determination, process and host clustering, host classification, rule based classification, disjoint process generation, or communication patterns graphic.

As the scale and complexity of a network grows, the number of hosts, processes, services and other network entities that require monitoring also increase. As a result, the task of identifying root causes of anomalies in the network and mitigating them becomes unmanageable. The technology disclosed solves this technical problem by generating a service oriented communication model that clusters the hosts in the network into services. In network architecture, the number of hosts is usually a multiple of the number of services in the network. For example, a storage service can include as hosts hundreds of server racks or thousands of individual servers. In addition, a service in a network can comprise of applications, processes, switches, routers, load balancers, and other network entities. Therefore, creating a network topology based on hosts or other network resources creates a noisy representation of the network architecture, which is cumbersome for a network operator to evaluate and work with.

The service oriented communication model is particularly distinct from the traditional host based network models that require the operator to evaluate a large number of host relationships. The service oriented communication model generates for display communication patterns between service clusters that can be further drilled-down to view mappings between the hosts clustered in the service clusters.

Accordingly, the amount of information presented to the operator is substantially streamlined, thereby providing the operator with a better understanding of the overall network communications. Enhanced operator friendliness and faster diagnosis of anomalies may result.

The technology disclosed can be used for understanding traffic patterns in a network that includes a multitude of processes running on numerous hosts. The technology disclosed can be used in a variety of applications including, information technology (IT) systems, telecommunications systems, financial systems, security trading, banking, business intelligence, marketing, mining, energy, etc. One implementation of the technology disclosed relates to IT systems operations. IT operational data refers to any data that is produced by any human, system (hardware or software), machine, application, software, or component within an IT environment. Some examples of this operational data include metrics (server, network, database, services, hypervisor), alerts, logs, errors, software pushes, or application topology.

Examples of systems, apparatus and methods according to the disclosed implementations are described in an information technology (IT) context. In other instances, the technology disclosed may be applied to fraud detection, telecommunications systems, financial systems, security trading, banking, business intelligence, marketing, mining, energy, etc. Other applications are possible, such that the following examples should not be taken as definitive or limiting either in scope, context or setting.

The technology disclosed can be implemented in the context of any computer-implemented system including an on-demand database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

As used herein, a given signal, event or value is "based on" a predecessor signal, event or value of the predecessor signal, event or value influenced by the given signal, event or value. If there is an intervening processing element, action or time period, the given signal, event or value can still be "based on" the predecessor signal, event or value. If the intervening processing element or action combines more than one signal, event or value, the signal output of the processing element or action is considered "based on" each of the signal, event or value inputs. If the given signal, event or value is the same as the predecessor signal, event or value, this is merely a degenerate case in which the given signal, event or value is still considered to be "based on" or "dependent on" the predecessor signal, event or value. "Responsiveness" of a given signal, event or value upon another signal, event or value is defined similarly.

Service Oriented Application Topology Generation

FIG. 1 shows an example environment 100 of generating a hierarchical service oriented application topology for a network. FIG. 1 includes an application data store 102, user feedback data store 105 and rules database 108. FIG. 1 also shows feature extraction engine 112, matching engine 118, graphics engine 122, clustering engine 125, classification engine 128 and network(s) 115. In other implementations, environment 100 may not have the same elements or components as those listed above and/or may have other/different elements or components instead of, or in addition to, those listed above, such as a rule induction engine, hierarchy data store, or application data assembly engine. The different elements or components can be combined into single software modules and multiple software modules can run on the same hardware.

Network(s) 115 is any network or combination of networks of devices that communicate with one another. For example, network(s) 115 can be any one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, WiFi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

In some implementations, the engines can be of varying types including a workstation, server, computing cluster, blade server, server farm, or any other data processing system or computing device. The engine can be communicably coupled to the databases via a different network connection. For example, feature extraction engine 112 and matching engine 118 can be coupled via the network(s) 115 (e.g., the Internet), clustering engine 125 can be coupled via a direct network link and classification engine 128 can be coupled by yet a different network connection.

In some implementations, data stores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Application data store 102 includes a list of applications, services and processes running on different hosts on a network, including routers, switches, firewalls, load balancers and servers. In one implementation, the list is maintained by the operating systems running on the hosts and is retrieved from the different hosts by an agent that carries out an application discovery process. In other implementations, application data store 102 includes a list of local programs of the different hosts, including startup programs, which run immediately when the hosts boot up.

In some implementations, the list of applications in the application data store 102 can be identified using various application attributes such as process identifiers, authorized user identifiers, process names, command strings and listen ports. For example, the following command strings ($C_n$) identify four different processes running on different hosts of a network. Examples of command strings include "su" commands, "bash" commands or other shell commands.

$C_A$=python web.py-c/etc/web.conf-x1-y2
$C_B$=python app.py-c10-d-reload
$C_C$=python app.py-c10-d
$C_D$=/bin/mongod-c/etc/mongod.conf Feature extraction engine 112 serves as a tokenizer or a parser that parses each command string into segments. In another implementation, it serves as a shingle module that parses each of the segments of the command string into N grams of various lengths (unigrams, bigrams, trigrams), or sliding windows of N grams, or minimum and maximum grams. The following example shows one implementation of generating token shingles from a command string "python, app.py, -alpha, 1, -d, 2, -e, 3." In this example, the command string is first split at each occurrence of a space to construct word tokens, generating the sequence {python, app.py, -alpha, 1, -d, 2, -e, 3}. Following this, the sequence of word tokens can be further parsed into sliding windows of four characters. The resulting token shingles are {pyth, ytho, thon, app., pp.p, p.py, -alp, alph, lpha, 1, d, 2, e, 3}.

Once the token shingles are constructed, the feature extraction engine 112 filters the token shingles by calculating a term frequency-inverse document frequency (TF-IDF) for each the token shingles, according to one implementation. In other implementations, different feature extraction or feature selection techniques can be used instead of TF-IDF, including bag of words and indicator variables. A TF-IDF weighting, or score, forms a statistical measure that can be used to evaluate how important a word is to a command string. The importance is deemed to increase linearly according to the number of times a word appears in the command string, but is offset by how common the word is in all of the command strings in a body of command strings, or a list of processes.

Various formulae can be used to compute a TF-IDF. In one example, the term frequency (TF) can be the number of times the term appears in a command string divided by the total number of terms in the command string. If a command string contains 1000 total terms and a term appears 5 times, then the term frequency of the term in the command string is 0.005 (5/1000). In this example, the document frequency (DF) can be computed as the number of command strings that contain the term divided by the total number of command strings in the list of processes. If the term appears in 1,000 command strings out of a total of 10,000,000 then the document frequency (DF) is 0.0001 (1000/10000000) and the Inverse Document Frequency (IDF) is 10,000. The TF-IDF score is then calculated by dividing the term frequency by the document frequency (TF/DF) or multiplying the term frequency by the Inverse Document Frequency (i.e., TF*IDF).

In the example described above, the TF-IDF score for the process list would be 50 (0.005/0.0001 or 0.0005*10,000). In some implementations, a high TF-IDF score can result from a high term frequency (in the given command string) and/or a low document frequency of the term in the whole collection of command strings; whereby the weights tend to filter out common terms. In other examples, other formulae can be employed to calculate the TF-IDF score.

Also, a commonly used TF-IDF formula uses the natural logarithm of the Inverse Document Frequency (Ln (IDF)). In this case, for a term appearing in all documents, Ln (1)=0. If a term appears only in 1 command string among 10,000,000, then Ln (10,000,000)=16.

A high weight in TF-IDF can be achieved by a high term frequency in the given document and a low document frequency of the term in the whole collection of documents; the weights hence tend to filter out common terms.

In some implementations, certain junk command strings or junk token shingles are detected and filtered out before feature extraction or feature selection. In one implementation, junk command strings or junk token shingles are pre-specified. For example, token shingles that are key value pairs can be automatically considered to be junk and deleted. In another example, command strings representing certain processes such as print queues, fax queues or other administrative processes that are not user-service oriented (e.g. virtual network computing) can be automatically considered to be junk and deleted. In yet another example, command strings comprising certain regular expressions can be filtered out prior to further processing. In other implementations, automatic filtering of junk command strings and/or junk token shingles can be used in combination with the feature extraction.

In one implementation, TF-IDF is used to represent each filtered token shingle in the vector space based on the following counting function:

$$tf(t, C) = \sum_{x \in d} fr(x, t)$$

where fr(x,t) is defined as:

$$fr(x, t) = \{1, \text{ if } x = t$$
$$\{0, \text{ otherwise}$$

The counting function tf(t,C) returns how many times the token shingle t is present in the command string C. In one example, for command string $C_D$=/bin/mongod-c/etc/mongod.conf, tf("mongod",$C_D$)=2 since there are only two occurrences of the term "mongod" in command string $C_D$.

Further, a command string vector is created using the following formula:

$$vC_n=(tf(t_1,C_n),tf(t_2,C_n,tf(t_3,C_n))$$

In addition, each dimension of the command string vector is represented by a token shingle. In one implementation, the resulting command string vectors for command strings $C_A$, $C_B$, $C_C$ and $C_D$ can be as follows:

$vC_A$=(0, 2, 2, 2)
$vC_B$=(0, 4, 2, 0)
$vC_C$=(2, 0, 2, 0)
$vC_D$=(4, 0, 4, 0)

In yet other implementation, different feature extraction or feature selection techniques can be used in addition or instead of to TF-IDF, including but not limited to, log (tf), wherein "tf" refers to term frequency, tf/max (tf), log [tf/max (tf)], entropy, global frequency (GF), and total document IDF weighted global frequency (GFIDF).

Graphics engine 122 generates for display animated and interactive visual representations of information generated, exchanged, stored or extracted in the service oriented application topology generation environment 100. In one implementation, visual representations generated by the graphics engine 122 include graphic elements that are linked to the hosts, processes and services in the network 115. These visual representations are used to generate a graphic of communication patterns among the services in the network 115. In another implementation, the graphics engine 122 allows for drill-down into details of communication links in a communication pattern graphic. The details identify the hosts that are part of the drilled-down service along with processes running on the hosts, according to yet another implementation.

Process Similarity Determination

The command string vectors are evaluated to determine whether the processes that they represent are similar. In some implementations, a plurality of techniques can be used to measure the process similarity. One example of such a technique is unigram overlap. The baseline unigram approach considers two command string vectors to be correlated if they have higher Jaccard similarity than a threshold after unigrams are extracted from each process being represented and the Jaccard similarity is computed. The Jaccard coefficient between the unigrams of each pair of processes A and B is used to measure the similarity of the pair of messages.

$$jaccard(A, B) = \frac{|A \cap B|}{|A \cup B|} \leq \frac{\min|A|, \cap |B|}{\max|A|, \cup |B|}$$

In some implementations, Jaccard similarity between two command strings can be conditional upon the presence of certain essential token shingles.

In another implementation, an edit distance technique can be used to determine the similarity between command string vectors representing different processes. The edit distance between two command strings is considered, that is, two command strings are correlated if the number of edits to transform one command string into the other is less than some threshold value. In some implementations, a Levenshtein distance can be used as a metric for measuring the amount of difference between two command strings. The distance is the minimum number of edits required in order to transform one command string into the other.

Cosine similarity is a vector-based similarity measure between command strings where the input command strings are translated to vectors in a high-dimensional space. Thus, more resembling command strings are also closer to each other in the vector space. In one implementation, the transformation of the input command strings to vectors is done based on the token shingles that appear in the command string, with each token corresponding to a dimension and the frequency of the token shingles in the input being the weight of the vector in that dimension. The command string similarity is then given by the cosine similarity of the two vectors (i.e., the cosine of the angle between the two vectors).

Another similarity metric is Euclidean distance which is the length of the line segment connecting two command string vectors (two processes in this context). The smaller the Euclidean distance between two processes, the more similar they are. The distance between vectors X and Y is defined as follows:

$$d(x, y) = \sqrt{\sum_{i}^{n} (x_i - y_i)^2}$$

Therefore, Euclidean distance is the square root of the sum of squared differences between corresponding elements of the two command string vectors.

FIG. 2 shows one implementation of identifying hosts of a network with common functionality. In particular, applying the formula above, the Euclidean similarities ($CE_{XY}$) 200 between the command string vectors for command strings $C_A$, $C_B$, $C_C$ and $C_D$ are determined to be:

$CE_{AB}$=2.828
$CE_{AC}$=3.464
$CE_{AD}$=5.292
$CE_{BC}$=4.472
$CE_{BD}$=6.000
$CE_{CD}$=2.822

In other implementations, different similarity measures can be used to determine similarity between the processes such as Tanimoto coefficient, Dice coefficient, Hamming distance, Needleman-Wunch distance or Sellers Algorithm, Smith-Waterman distance, Gotoh Distance or Smith-Waterman-Gotoh distance, Block distance or L1 distance or City block distance, Monge Elkan distance, Jaro distance metric Jaro Winkler, SoundEx distance metric, Matching Coefficient, Dice Coefficient, Overlap Coefficient, Variational distance, Hellinger distance or Bhattacharyya distance, Information Radius (Jensen-Shannon divergence) Harmonic Mean, Skew divergence, Confusion Probability, Tau, Fellegi and Sunters (SFS) metric, FastA, BlastP, Maximal matches, q-gram, Ukkonen Algorithms and Soergel distance. In yet other implementations, different correlation measures can be used.

Process and Host Clustering

Given a similarity distance measure, a reasonable procedure for clustering n observations about the processes can be used by the clustering engine 125. First, the command string vectors are grouped into as many clusters as there are observations, that is, with each observation forming a separate cluster. Following this, the pair of observations that are nearest one another are clustered, leaving n−1 clusters. Next, a cluster is merged with a pair of clusters that are nearest to one another, leaving n−2 clusters. Continuing in this manner, the number of clusters are reduced by one at each action, until a single cluster is formed consisting of all n observations. At each action, the distances at which the clusters are formed are tracked.

In other implementations, clustering can include mapping each command string to a process signature. When two or more command strings map to the same process signature, they are grouped in the same cluster. In other implementations, different clustering approaches can be used, including hash-based approach where each observation is placed in a cluster based on the value it produces based on some hash function, hierarchical agglomerative clustering with ward linkage criterion or a hierarchical divisive method that follows the reverse procedure in that it begins with a single cluster consisting of all observations, forms next 2, 3, etc. clusters, and ends with as many clusters as there are observations.

The process clusters identify hosts which share common functionality. In other words, hosts with processes that are clustered together are determined to have similar functionality.

In some implementations, the user feedback can be received on the clustered hosts and processes. The user feedback can be stored in the user feedback data store 105. For example, an operator can choose to ignore an entire process cluster or reject certain specific hosts and/or processes from a cluster. Subsequent clustering operations can take into account such feedback and produce more user-desired results.

Host Classification

Once hosts that have similar processes are identified, clustered hosts are classified into service profiles using a machine learning based classifiers that use the token and shingles as features. A service profile is a set of processes that forms a logical unit. In one implementation, each clustered host corresponds to a process signature, and is evaluated against a rule database 108 for classification to a particular service profile. FIG. 3 shows one implementation of classification 300 of hosts with common functionality into service profiles. The distance between the observations can be measured using the nearest neighbor or single linkage method. Observations $C_A$ and $C_B$ are nearest (most similar) and, as shown in FIG. 2, are grouped in the same cluster 1 of FIG. 3. Similarly, observations $C_C$ and $C_D$ are nearest (most similar) and are grouped in the same cluster 2 of FIG. 3.

In another optional implementation, the clustered hosts are labelled as service profiles based on receiving manual labelling of hosts from users. For example, an operator can evaluate the processes running on a host such as an application server and can use his or her experience to identify the host as belonging to a particular type of service profile like Mongo database service. In some implementations, the optional manual labelling is performed only when the machine learning based classification fails.

One example of machine learning is logistic regression in which cross-validation is used to classify hosts into service profiles. According to this example, classification engine 128 classifies the hosts based upon a logistic regression algorithm. Classification engine 128 applies the logistic regression algorithm to the binary command string vectors of the processes to compute the probability P of a classification of the hosts which run those processes. In other implementations, the classification engine 128 receives feedback from the user in the form of manually labelled hosts and/or or any other type of classification data from an external source, and generates updated logistic regression parameters. The user feedback can be stored in the user feedback data store 105. Since the classification engine 128 uses logistic regression parameters that reflect external classification data, the accuracy of the host classification is significantly enhanced.

In other implementations, users can select a process cluster or a subset of processes in the process cluster and further assign them a service profile from a pre-selected list of profiles. In yet other implementations, the users can specify their own custom service profiles.

In further implementations, the command string vectors are further filtered using the above described TF-IDF prior to being logistically regressed. This also results in the enhanced accuracy of the host classification.

In yet other implementations, other supervised learning algorithms can be used, including support vector machines (SVMs), neural nets, naïve bayes, memory-based learning, random forests, decision tress, bagged trees, boosted trees and boosted stumps.

Rules Based Classification

Rules database 108 includes rules that are defined so as to classify processes and services into service profiles. In one implementation, rules database 108 includes process-specific rules that are used by the matching engine 118 to evaluate filtered token shingles of a process and to determine whether they match a reference process defined by the process-specific rules. Once a positive determination is made, the evaluated process is identified to be the same as the reference process. In some implementations, process-specific rule based matching can be used to identify command strings that belong to the same process. This allows further filtering of similar processes before they are evaluated to identify hosts with common functionality, as described above in this application under the section entitled "Process Similarity Determination".

In one implementation, the process-specific rules are defined based on key command parameters such as interpreter, script name, program name, service port, options, mandatory parameters and available parameters. The command parameters can be automatically extracted using the feature extraction engine 112, as described above, and/or can be optionally selected based on human feedback. In some implementations, the optional human feedback based selection is performed only when the feature extraction engine 112 fails to identify the command parameters.

In one example, the command parameter values for command strings $C_A$ and $C_D$ are described below:

$C_A$=python web.py-c/etc/web.conf-x1-y2
   interpreter=python
   script=web.py
   options=[-x, 1, -y. 2]
$C_D$=/bin/mongod-c/etc/mongod.conf
   interpreter=null
   script=/bin/mongod
   options=[-c,/etc/mongod.conf]

The following example shows one implementation of process-specific rule based matching:

$C_B$=python app.py-c10-d-reload
$C_C$=python app.py-c10-d"
Process-specific rule X=[interpreter=python, script name=app.py, mandatory_params={reload: True}]

According to the process-specific rule based matching above, command string $C_B$ matches the process-specific rule X. In contrast, command string $C_C$ does not match the process-specific rule X.

The following example shows another implementation of process-specific rule based matching:

$C_B$=python app.py-c10-d-reload
$C_C$=python app.py-c10-d"
Process-specific rule Y=[interpreter=python, script name=app.py, optional_params={reload: True}]

According to the process-specific rule based matching above, command string $C_B$ matches the process-specific rule Y. Similarly, command string $C_C$ also matches the process-specific rule Y.

Along with process-specific rules, the rules database 108 also maintains service-specific rules that are used by the matching engine 118 to evaluate a set of command strings and to determine whether the set matches a reference service profile defined by the service-specific rules. Once a positive determination is made, the evaluated set of command strings is identified to be the same as the reference service profile. The following syntax is one example of a service-specific rule:

Service-specific rule Z=[$P_A$, $P_B$,$P_C$,$P_N$]

According to one implementation of service-specific rule based matching, each process-specific rule specified by the service-specific rule should match against a different command string in the set of command strings being evaluated by the matching engine 118. The matching can be of two types and can be applied independently or in combination. In one implementation, the matching includes identifying matching command parameter values. In addition to the service-specific rule based matching, one or more certain essential command parameter values specified by the service-specific rule must be present in the set of process-specific rules being evaluated by the matching engine 118. If the one or more certain essential command parameter values exist are present, the set of process-specific rules is determined to have the service profile corresponding to the service-specific rule.

In some implementations, the users can create a new customer-specific service rule by specifying a set of processes. The customer-specific service rule can include weight coefficients that prioritize the significance of the processes in the set of processes based on customer feedback, according to one implementation.

Disjoint Process Generation

In some implementations, the processes can be grouped into services using a clustering algorithm that generates independent sets of processes mapped to sets of hosts. The results of the clustering algorithm produce disjointed process clusters that are more suitable for facilitating user feedback. The clustering algorithm further assists in identifying independent sets of processes that are not classified as belonging to a particular service profile. This in turn allows users to provide feedback on a smaller set of processes with unique behavioral attributes.

According to one implementation, the clustering algorithm includes three actions—feature selection (tokenization), item set clustering and independent sets generation. Feature selection maps similar processes into one group as described above in this application. As a result, processes with minor differences across hosts do not result in fragmentation of clusters. In some implementations, feature selection is applied to each command string of a host to extract relevant token shingles that form a process signature.

Following this, for each process signature, the sets of hosts running the process with the corresponding process signature are clustered, as described in the section entitled "Process and Host Clustering". In addition, filtering is performed to remove any irrelevant token shingles and/or command strings.

Then, pairs of process signatures are combined by taking an intersection of sets of hosts. The intersections results in sets of hosts that run signature pairs. Further, the sets are repeatedly combined to construct larger sets of process signatures until the set intersection is NULL. Some examples of process signatures based clusters are as follows:

(Agent)-{subset of hosts}
(Mongo)-{subset of hosts}
(OpenTSDB)-{subset of hosts}
(Agent, Mongo)-{subset of hosts}
(Agent, OpenTSDB)-{subset of hosts}
(Mongo, OpenTSDB)-{subset of hosts}
(Agent, Mongo, OpenTSDB)-{subset of hosts}

Advancing further, independent sets are generated from the process signatures based clusters so as to produce service oriented classification of hosts. Some examples of service oriented classification of processes is given below:

(Agent Signature)-{subset of hosts}
(Mongo Signature, OpenTSDB Signature)-{subset of hosts}

In one implementation, the clustering algorithm that generates independent sets of processes mapped to sets of hosts can be defined as follows:

Initial set S: A, B, C, D, . . .
Final solution T={ }
Pick A
   Calculate A & B, A-B, B-A
   Store B-A, A & B in S
   A=A-B
   Repeat with C, D . . .
A-B-C-D . . . is independent, store in T
Repeat with B, C, D . . .

where "A&B" refers to intersection of A and B, "A-B" identifies elements that are in A but not in B and "B-A" identifies elements that are in B but not in A.

What follows is an example of applying the independent sets algorithm to host clusters that result in service oriented classification of processes.

Assume processes P1, P2, P3, P4 run on host H1
Assume processes P1, P2, run on host H2
Assume processes P1, P3, P4 run on host H3

It is preferable to classify the processes as services. For instance, if process P1 is a java process, then instead of referring to it as simply a java process, it can be specified as a HadoopDataIlode, which requires java to be run in a particular way. If the processes are not appropriately classified, then the processes can be identified in a way that allows the customers to easily provide their feedback about the processes. According to one implementation, this can be achieved by clustering the processes as follows:

P1→H1, H2, H3
P1, P2→H1, H2
P1, P3→H1, H3
P1, P4→H1, H3
P1, P2, P3, P4→H1

The above clustering output is produced using item set clustering. While such an output is useful, it is not most-suitable for receiving customer feedback. In addition, if a process, such as process P1, occurs in multiple clusters, then the customers may have to give the same feedback multiple times. Therefore, it is preferable that each of these process sets are disjointed as follows:

P1→H1, H2, H3
P2→H1, H2

P3→H1, H3
P4→H1, H3
P3, P4→H1, H3

First, the process sets of the item set clusters are classified into respective sets of A, B, C, D and E.

A={P1}, B={P1, P2}, C={P1, P3},D={P1, P4}, E={P1, P2, P3, P4}

Then, mutually exclusive and collectively exhaustive disjoint sets X, Y, Z are determined for sets A and B.

X=A & B={P1}
Y=A-B=NULL
Z=B-A={P2}

Now, sets A and B are respectively replaced by disjoint sets X and Z.

X, Z, C, D, E

Then, mutually exclusive and collectively exhaustive disjoint sets X1, Y1, Z1 are determined for sets X and C.

X, C
X={P1}, C={P1, P3}
X1=X & C={P1}
Y1=X-C=NULL
Z1=C-X={P3}

Now, sets X and C are respectively replaced by disjoint sets X1 and Z1.

X1, Z, Z1, D, E

Then, mutually exclusive and collectively exhaustive disjoint sets X2, Y2, Z2 are determined for sets X1 and D.

X1, D
X1={P1}, D={P1,P4}
X2=X1 & D={P1}
Y2=X1-D=NULL
Z2=D-X1={P4}

Now, sets X1 and D are respectively replaced by disjoint sets X2 and Z2.

X2, Z, Z1, Z2, E

Then, mutually exclusive and collectively exhaustive disjoint sets X3, Y3, Z3 are determined for sets X2 and E.

X2, E
X2={P1}, E={P1, P2, P3, P4}
X3=X2 & E={P1}
Y3=X2-E=NULL
Z3=E-X2={P2, P3, P4}

Now, sets X2 and E are respectively replaced by disjoint sets X3 and Z3.

X3, Z, Z1, Z2, Z3

Then, mutually exclusive and collectively exhaustive disjoint sets I, J, K are determined for sets Z and Z1.

Z, Z1
Z={P2}, Z1={P3}
I=Z & Z1=NULL
J=Z-Z1={P2}
Q=Z1-Z={P3}

Now, sets Z and Z1 are respectively replaced by disjoint sets J and Q.

X3, J, Q, Z2, Z3

Then, mutually exclusive and collectively exhaustive disjoint sets I1, J1, K1 are determined for sets J and Z2.

J, Z2
J={P2}, Z2={P4}
I1=J & Z2=NULL
J1=J-Z2={P2}
Q1=Z2-J={P4}

Now, sets J and Z2 are respectively replaced by disjoint sets J1 and Q1.

X3, J1, Q, Q1, Z3

Then, mutually exclusive and collectively exhaustive disjoint sets I2, J2, K2 are determined for sets J1 and Z3.

J1, Z3
J1={P2}, Z3={P2, P3, P4}
I2=J1 & Z3={P2}
J2=J1-Z3=NULL
Q2=Z3-J1={P3, P4}

Now, sets J1 and Z3 are respectively replaced by disjoint sets I2 and Q2.

X3, I2, Q, Q1, Q2
X3={P1}, I2={P2}, Q={P3}, Q1={P4}, Q2={P3, P4}

Thus, now all of the sets are independent and can be mapped to the hosts based on the initial assumptions to produce the following desired process clusters:

P1→H1, H2, H3
P2→H1, H2
P3→H1, H3
P4→H1, H3
P3, P4→H1, H3

Based on this output, it can be determined that processes P1, P2, P3 and P4 are separate services. In addition, it can be determined that processes P3 and P4 together constitute a service. In other implementations, processes P3 and P4 can be determined to be separate services. This can be achieved by defining a rule such as "Service_X=P3 or Service_Y=P4", or they can identified by a user as separate processes.

Service Profile Classification Workflow

FIG. 4 illustrates a workflow 400 of generating hierarchical service oriented application topology for a network. Other implementations may perform the actions in different orders and/or with different, fewer or additional actions than the ones illustrated in FIG. 4. Multiple actions can be combined in some implementations. For convenience, this chart is described with reference to the system that carries out a method. The system is not necessarily part of the chart.

In workflow 400, application data is provided to the feature extraction engine 112 at action 402. The feature extraction engine 112 carries out tokenization of the application data at action 412 and divides each command string into segments, and further divides each of the segments of the command string into sliding windows of N grams called token shingles.

At action 414, the feature extraction engine 112 filters the token shingles by calculating term frequency-inverse document frequency (TF-IDF) for the token shingles. In other implementations, other filtering techniques can be used, including but not limited to, log (tf), tf/max (tf), log [tf/max (tf)], entropy, global frequency (GF), and total document IDF weighted global frequency (GFIDF). At action 416, certain junk processes are detected and filtered out based on contents of the command strings representing the different processes. In one example, command strings representing certain processes such as print queues, fax queues or other administrative processes that are not user-service oriented (e.g. virtual network computing) are automatically considered to be junk and deleted.

At action 418, the filtered processes are provided as input for command parameter(s) based clustering of a plurality of hosts of a network at action 420. The command parameters comprise command strings representing different processes. A plurality of similarity metrics can be employed to evaluate the command strings and to identify similar processes. Once identified, the similar processes are then grouped into clusters, which specify hosts that share common functionality.

At action 422, the command parameter(s) based clustering is refined based on human feedback. In some implementations, human feedback can be received on the clustered hosts and processes. For example, an operator can choose to ignore an entire process cluster or reject certain specific hosts and/or processes from a cluster. Subsequent clustering operations can take into account such feedback and produce more user-desired results. In other implementations, users can select a process cluster or a subset of processes in the process cluster and further assign them a service profile from a pre-selected list of profiles.

In yet other implementations, the users can specify their own custom service profiles, constituting custom clustering, performed at action 424.

At action 426, rule-based classification and/or logistic regression with cross-validation is used to map hosts into service profiles. This action is referred to as process clustering. In some implementations, the classification engine 128 classifies the hosts based upon a logistic regression algorithm. Classification engine 128 applies the logistic regression algorithm to the binary command string vectors of the processes to compute the probability P of a classification of the hosts which run those processes.

In some implementations, the rule engine 428 acts as a classification engine. In such an implementation, the rule engine 428 evaluates the processes and the sets of processes against the process-specific and service specific rules specified in the rules database 108, and further classifies them accordingly.

At action 440, the clustered hosts are classified into service profiles. This action is referred to as service classification. In one implementation, the classification is performed using the rule engine 428, as described above. In another implementation, the classification is based on receiving manual labelling of hosts from users, which is used in turn used to train machine learning based classifiers. For example, an operator can evaluate the processes running on a host such as an application server and can use his or her experience to identify the host as belonging to a particular type of service profile like Mongo database service. The labelled service clusters can also be used by the rule engine for subsequent classification of the hosts in accordance with the previously recorded user feedback.

At action 442, unlabeled clusters are presented to the user for feedback. In one implementation, receiving user feedback at action 448 includes deleting certain clusters at action 444. In another implementation, the user feedback includes users specifying custom service profiles at action 446 based on the user's needs and system architectures.

In other implementations, user feedback is inducted into the rules database 108 at action 448 so that it used for subsequent clustering and classification of hosts and processes into service profiles.

Communication Patterns Graphic

FIG. 5 depicts one implementation of a communication patterns graphic 500 that graphically represents a host oriented network topology. In other implementations, communication patterns graphic 500 may not have the same tabs, widgets, windows, screen objects, elements, or components as those listed above and/or may have other/different tabs, widgets, windows, screen objects, elements, or components instead of, or in addition to, those listed above, such as network topology graph, inter-anomaly time spacing, slider zoom control, or resource redundancy graph. The different tabs, widgets, windows, screen objects, elements, or components can be combined into single software modules and multiple software modules can run on the same hardware.

As illustrated by FIG. 5, host based mapping creates a graphic that is unsuitable for human processing. The overload of information creates a convoluted graphic that requires substantial human effort and time before it can be benefited from. For instance, if an anomaly is detected in the network, it would take the network operator great time and thinking to determine which hosts or other network entities might be impacted by the detected anomaly or subsequently might be impacted in the near future.

In contrast, FIG. 6A shows a communication patterns graphic 600A that graphically represents a service oriented application topology. Compared to graphic 500, the number of graph elements in graphic 600A is significantly less, making graphic 600A much more operator-friendly. Such a streamlined presentation of network architecture is achieved due the service oriented approach of graphic 600A. Thus, upon detection of a network anomaly, the network operator can use a plurality of elegant analysis techniques to identify the consequences of the detected anomaly.

In one example shown in FIG. 6B, the service, which constitutes the host on which the anomaly occurred, is flagged. In one implementation, the operator can hover over the flagged service and be presented with a drill-down menu 602 that lists the hosts and/or other network entities clustered as the service. Upon drilling-down, the operator can identify the particular host on which the anomaly occurred based on the flagging of the host.

In another example, the operator can identify which other hosts and/or network entities are impacted by the detected anomaly by tracking which services are connected to the service on whose host the anomaly is detected. Using the example illustrated in graphic 600B, if the network anomaly is detected on host "Hadoop1" of service "ZooKeeper-1", then the impacted network entities can be identified by tracking the connection 604 of service "ZooKeeper-1" that leads to impacted or likely to be impacted service "HBaseRegionServer-1". Upon drilling-down 606 the service "HBaseRegionServer-1", impacted or likely to be impacted hosts and/or other network entities can identified, such as host "pacific-data1".

In other implementation, the impacted or likely to be impacted network entities can be identified using other visual feedback or schemes such as color coding, filled shapes, blinking or dimming effects, and/or other distinctive background, effects, shapes or markers.

In other implementations, communication patterns graphics 600A and 600B may not have the same tabs, widgets, windows, screen objects, elements, or components as those listed above and/or may have other/different tabs, widgets, windows, screen objects, elements, or components instead of, or in addition to, those listed above, such as network topology graph, inter-anomaly time spacing, slider zoom control, or resource redundancy graph. The different tabs, widgets, windows, screen objects, elements, or components can be combined into single software modules and multiple software modules can run on the same hardware.

In particular, communication patterns graphics 600A and 600B depict the connections between services and/or the hosts and the services. In some implementations, constructing the communication patterns graphics 600A and 600B include two actions. In the first action, a raw connection graph is built between the hosts (e.g. Host A→Host B). This raw connection graph also specifies various connection statistics such as number of connections, average connection lifetime and average data transfer volume.

In the second action, an aggregated service graph is built. The aggregated service graph aggregates host-level connections into service-level connections (e.g. Service A→Service B, Service A→Host B, Host A→Service B). This aggregated service graph also specifies various connection statistics including but not limited to number of connections, distinct pairs of hosts, time since last connection and connection lifetime.

Flowchart of Understanding Traffic Patterns in a Network

FIG. 7 is a flowchart 700 showing a method of understanding traffic patterns in a network with a multitude of processes running on numerous hosts. Flowchart 700 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this flowchart is described with reference to the system that carries out a method. The system is not necessarily part of the method.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as service oriented application topology generation environment, vector space model representation, process similarity determination, process and host clustering, host classification, rule based classification, disjoint process generation, or communication patterns graphic.

At action 710, command parameters are derived from application startup data using a parser that determines which of the command parameters are relevant for identification of services. The command parameters include at least one of interpreter, script name, program name, service port and options.

At action 720, derived command parameters are used to ignore one or more processes that are not user-service oriented. In one implementation, the clustering further includes determining which groups of processes are co-located on hosts. In another implementation, the clustering further includes receiving human feedback on the clustering and updating the grouped processes based on the human feedback. Further, a combination of the determined co-located groups and the updated grouped processes is used for further clustering.

At action 730, processes running on numerous hosts are clustered into local services and the local services running on multiple hosts are clustered into service clusters. Clustering the processes further includes parsing of application startup data for the numerous hosts. The parsing includes generating tokenized shingles of the application startup data.

At action 740, the service clusters are used to aggregate communications among the local services and the processes running on the hosts. In one implementation, common functionality between the numerous hosts is identified based on similarities between the tokenized shingles.

At action 750, a graphic of communication patterns is generated among the service clusters with available drill-down into details of communication links in the communication pattern graphic.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Computer System

FIG. 8 is a block diagram of an example computer system 800 for understanding traffic patterns in a network with a multitude of processes running on numerous hosts. Computer system 810 typically includes at least one processor 814 that communicates with a number of peripheral devices via bus subsystem 812. These peripheral devices can include a storage subsystem 824 including, for example, memory devices and a file storage subsystem, user interface input devices 822, user interface output devices 820 and a network interface subsystem 817. The input and output devices allow user interaction with computer system 810. Network interface subsystem 817 provides an interface to outside networks, including an interface to corresponding interface devices in other computer systems.

User interface input devices 822 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 810.

User interface output devices 820 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules and methods described herein. These software modules are generally executed by processor 814 alone or in combination with other processors.

Memory 827 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 828 in the storage subsystem 824, or in other machines accessible by the processor.

Bus subsystem 812 provides a mechanism for letting the various components and subsystems of computer system 810 communicate with each other as intended. Although bus subsystem 812 is shown schematically as a single bus, alternative implementations of the bus subsystem can use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as one example. Many other configurations of computer system 810 are possible having more or fewer components than the computer system depicted in FIG. 8.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A system for generating hierarchical service oriented application topology of a network with a multitude of processes running on numerous hosts, the system comprising:
    a machine learning-based classifier trained to cluster the hosts into service profiles by:
        evaluating command parameters of respective processes running on the hosts by applying logistic regression to string vectors of the command parameters to calculate a probability of classifying a host into a particular service profile, and
        based on the evaluation, classifying hosts that run similar processes as having a same service profile; and
    a graphic generator that generates a graphic of the topology of the network based on the service profiles produced by the machine learning-based classifier.

2. The system of claim 1, wherein the service profiles cluster hosts that share common functionality.

3. The system of claim 1, wherein the machine learning-based classifier evaluates string vectors of the command parameters against process-specific rules stored in a rule database.

4. The system of claim 1, wherein the string vectors are chosen based on their respective term frequency-inverse document frequencies (TF-IDFs) prior to being evaluated by the machine learning-based classifier.

5. The system of claim 1, wherein the machine learning-based classifier applies a logistic regression algorithm that uses cross-validation to classify hosts into service profiles.

6. The system of claim 1, wherein the machine learning-based classifier is trained using manually labelled training data.

7. The system of claim 1, wherein the machine learning-based classifier includes a neural network.

8. The system of claim 1, wherein the machine learning-based classifier applies a naïve bayes algorithm to command parameters.

9. A method of generating hierarchical service oriented application topology of a network with a multitude of processes running on numerous hosts, the method including:
    using a trained machine learning-based classifier to cluster the hosts into service profiles by:
        evaluating command parameters of respective processes running on the hosts by applying logistic regression to string vectors of the command parameters to calculate a probability of classifying a host into a particular service profile, and
        based on the evaluation, classifying hosts that run similar processes as having a same service profile; and
    generating a graphic of the topology of the network based on the service profiles produced by the trained machine learning-based classifier.

10. The method of claim 9, wherein the service profiles cluster hosts that share common functionality.

11. The method of claim 9, wherein the trained machine learning-based classifier evaluates string vectors of the command parameters against process-specific rules stored in a rule database.

12. The method of claim 9, wherein the string vectors are chosen based on their respective term frequency-inverse document frequencies (TF-IDFs) prior to being evaluated by the trained machine learning-based classifier.

13. The method of claim 9, wherein the trained machine learning-based classifier applies a logistic regression algorithm that uses cross-validation to classify hosts into service profiles.

14. The method of claim 9, wherein the trained machine learning-based classifier is trained using manually labelled training data.

15. The method of claim 9, wherein the trained machine learning-based classifier includes a neural network.

16. The method of claim 9, wherein the trained machine learning-based classifier applies a naïve bayes algorithm to command parameters.

17. One or more non-transitory computer readable media having instructions stored thereon for performing a method of generating hierarchical service oriented application topology of a network with a multitude of processes running on numerous hosts, the method including:
    using a trained machine learning-based classifier to cluster the hosts into service profiles by:
        evaluating command parameters of respective processes running on the hosts by applying logistic regression to string vectors of the command parameters to calculate a probability of classifying a host into a particular service profile, and
        based on the evaluation, classifying hosts that run similar processes as having a same service profile; and
    generating a graphic of the topology of the network based on the service profiles produced by the trained machine learning-based classifier.

18. The one or more non-transitory computer readable media of claim 17, wherein the trained machine learning-based classifier includes a neural network.

19. The one or more non-transitory computer readable media of claim 17, wherein the trained machine learning-based classifier evaluates string vectors of the command parameters against process-specific rules stored in a rule database.

20. The one or more non-transitory computer readable media of claim 17, wherein the trained machine learning-based classifier applies a logistic regression algorithm that uses cross-validation to classify hosts into service profiles.

* * * * *